United States Patent [19]
Hendricks

[11] 3,831,611
[45] Aug. 27, 1974

[54] DENTAL FLOSS UNIT
[75] Inventor: Thelma Hendricks, La Grange, Ga.
[73] Assignee: The Raymond Lee Organization, Inc., New York, N.Y. ; a part interest
[22] Filed: Feb. 6, 1973
[21] Appl. No.: 330,119

[52] U.S. Cl. ............................................. 132/92 R
[51] Int. Cl. .............................................. A61c 15/00
[58] Field of Search .................... 132/92 R; 32/40 R

[56] References Cited
UNITED STATES PATENTS
| | | | |
|---|---|---|---|
| 465,677 | 12/1891 | Pettit | 132/92 R |
| 655,548 | 8/1900 | Espey et al. | 132/92 R |
| 1,608,212 | 11/1926 | Hochstadter | 132/92 R |

FOREIGN PATENTS OR APPLICATIONS
| | | | |
|---|---|---|---|
| 206,343 | 11/1923 | Great Britain | 132/92 R |

Primary Examiner—Robert Peshock
Attorney, Agent, or Firm—Howard I. Podell

[57] ABSTRACT

A unit for handling dental floss, for the purpose of cleaning the teeth, in the form of a cylindrical rod with the dental floss contained on a spindle inside the rod and led out through a hole in the side. The dental floss is wrapped several turns around the rod and led through an eye opening at the rod's end with the free end of the floss grasped by one hand and the rod about which the floss has been wrapped grasped with the other hand when cleaning the teeth. One edge of the eye opening at the end of the rod is finished with a cutting edge so that after a section of dental floss has been used, it may be cut off.

1 Claim, 2 Drawing Figures

PATENTED AUG 27 1974 3,831,611

DENTAL FLOSS UNIT

SUMMARY OF THE INVENTION

This invention relates to a holder and storage unit for dental floss, and particularly for such a holder which may serve as a handle to hold one end of the section of dental floss that is used to clean the teeth.

The advantage of this device is that a length of dental floss may be fed from a self-contained spindle inside of the device and wrapped several times around the exterior of the device to furnish a grip on the floss, with the floss then being led through a hole at the end of the rod so as to be grasped by the other hand. The floss may be readily cut, after use, by being abraded against a cutting edge of the tool, located in the hole at the end of the rod.

The tool is in the form of a cylindrical rod which consists of a hollow section for containing a spindle of dental floss, that is threadibly connected to the solid exterior section of the rod which acts as a holding device when the dental floss that is led from the spindle through a hole in the rod wall is wrapped several turns about the exterior of the rod. The dental floss is led off the rod through an eye at the rod end, with the free end of the floss grasped with one hand and the rod grasped with the other hand for manipulating the floss so as to clean the teeth. When the used section of floss is to be discarded it is readily cut off by being abraded against a cutting edge in the eye of the rod.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
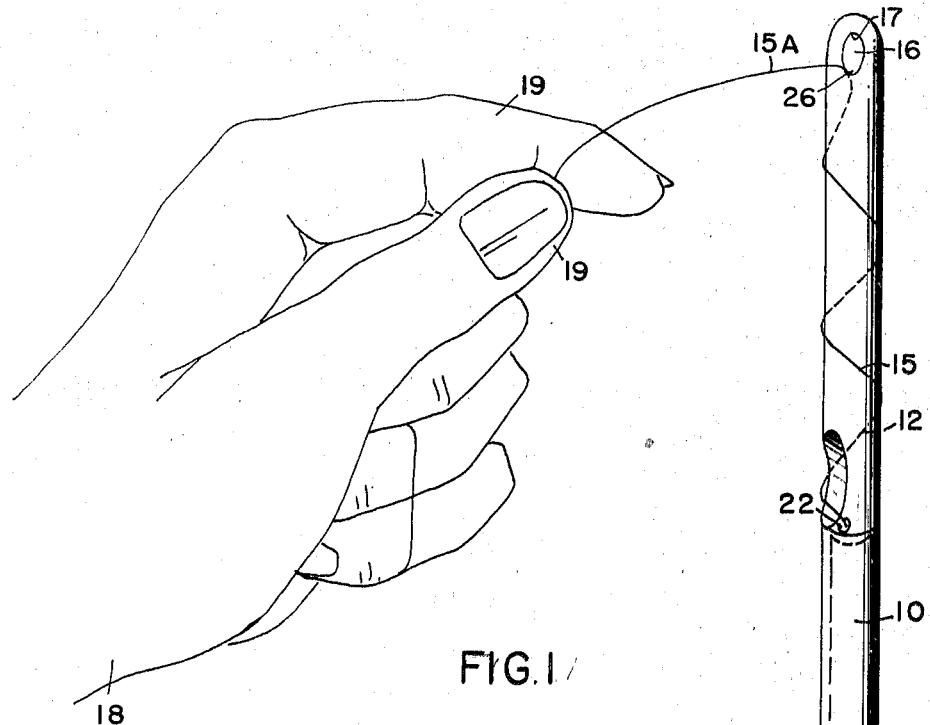
FIG. 1 is a perspective view of the dental floss unit.
Figure 2:
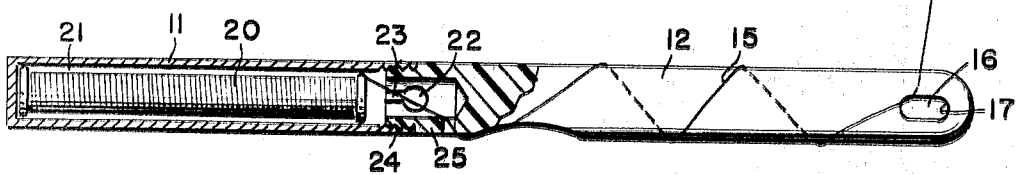
FIG. 2 is a plan sectional view of the device.

Turning now descriptively to the drawings, in which similar reference characters denote similar elements throughout the several views, FIG. 1-2 illustrate the device 10 which is in the form of a cylindrical rod consisting of hollow member 11 and solid member 12 that are joined together by male screw threads 24 on member 12 which mate with female screw threads 25 on the inside circumference of member 11. A spindle 20 of dental floss 15 is fitted in the cylindrical recess 21 of hollow member 11 with the dental floss being led through an axial hole 23 at the adjacent end of solid member 12, said axial hole being joined to a lateral hole 22 which pierces the solid member 12 for leading the dental floss out of the container and permitting the dental floss to be anchored by being wrapped several turns about the outside perimeter of solid rod member 12. Dental floss 15 may then be led through an open eye 16 at the free end of rod 12 so that a free length 15A of the dental floss may be grasped by the fingers 19 of the hand 18 of the user to maintain a taut, free section of dental floss between the fingers 19 of the user and the eye 16 of the rod 12 of the device. Dental floss is furnished in either the waxed or the unwaxed form with the waxed form, particularly, being very slippery and very difficult to control in conventional practice. By wrapping the dental floss 15 several turns about the perimeter of the spindle section 12 of the device, the wrapped section of the floss 15 frictionally engages the spindle section 12 in a tight manner, while the taut section 15A is manipulated for the purposes of cleaning the teeth. Eye 16 is in the form of an oval shaped hole with the dental floss 15 bearing against the inside face 26 of the eye while the dental floss is being employed to clean the teeth. When the section 15A that has been so employed is to be discarded, the user pulls the dental floss 15A towards the extreme outer face 17 of the eye 16, with the outer face 17 being shaped in the form of a cutting edge so as to tear the used section of dental floss off and to permit additional dental floss to be drawn through eye 16 for a fresh supply.

Spindle 20 may be replaced when required by unthreading tubular section 11 from spindle section 12.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A device for the handling of dental floss, in the general shape of a cylinder of uniform diameter, with one section of the cylinder containing a hollow axial recess for the storing of a spindle of dental floss, and with a hole in the side wall of said cylinder section for the drawing of a length of dental floss stored on the spindle through said hole of the exterior of the device, with the cylindrical wall of the solid section of the device serving as a fixed spindle about which to wrap the dental floss so as to hold a free end of the dental floss tight, with the wrapped turns of dental floss about the cylindrical wall serving to provide frictional engagment, and with the wall of the solid section, about which the floss may be wrapped, providing a bearing surface against which a finger of the user may press the wrapped floss to obtain further frictional engagement, with
   an eye located at the end of the solid spindle section through which the free section of dental floss may be led off of the spindle, in which
   a cutting edge is formed on an inside surface of the eye at the end of the spindle so as to permit cutting the free section of dental floss after it has been used, the cutting edge being located in the section of the eye adjacent to the free end of the spindle so that the cutting edge does not come into engagement with the dental floss during normal use, with the dental floss in normal use being manually held against the opposed rounded face of the eye from the cutting edge,
   said rounded face of the eye being adjacent to the section of the spindle about which the dental floss is wrapped.

* * * * *